April 4, 1950     C. N. HICKMAN     2,502,458
TRAP FOR ROCKET PROPELLENTS
Filed Nov. 16, 1944
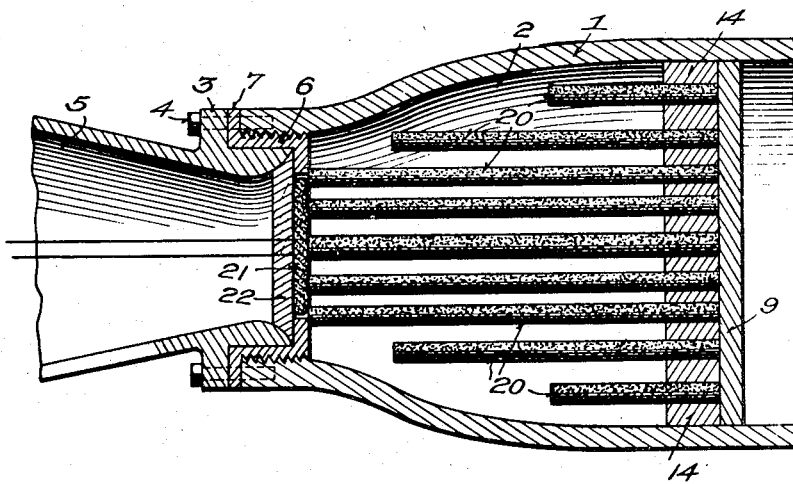
Inventor
CLARENCE N. HICKMAN,
By C. E. Herrstrom & N. E. Thibodeau
Attorneys Patented Apr. 4, 1950

2,502,458

UNITED STATES PATENT OFFICE 2,502,458

TRAP FOR ROCKET PROPELLANTS

Clarence N. Hickman, Jackson Heights, N. Y.

Application November 16, 1944, Serial No. 563,737

1 Claim. (Cl. 60—35.6)

(Granted under the act of March 3, 1883, as amended April 30, 1928; 370 O. G. 757)

The invention described herein may be manufactured and used by or for the Government for governmental purposes without the payment to me of any royalty thereon.

This invention relates to rocket projectiles and particularly to traps utilized to retain propellants within the combustion chamber of the rocket projectile.

One of the well recognized difficulties encountered in rocket projectiles utilizing a plurality of powder elements as a propellant, was the retention of the sticks of powder within the rocket motor combustion chamber until all of the powder was substantially consumed in combustion.

The following factors contributed to the difficulties encountered: first, a high inertia force is produced on the propellant due to the initial rapid acceleration of the rocket projectile. Such force naturally tends to discharge the propellant out of the rear of the projectile; secondly, the high velocity turbulent flow of gases generated by the combustion of the propellant tends to carry the propellant out of the combustion chamber; thirdly, a trap which is effective in retaining small pieces of the propellant within the motor chamber is generally found to offer too much resistance to the flow of gases out of the chamber, hence permitting dangerous build up of pressure within the chamber.

Accordingly it is an object of this invention to provide improved traps for propellant of a rocket projectile.

A particular object of this invention is to provide an arrangement for trapping the propellant of a rocket projectile wherein the propellant is secured to the rocket projectile by only its extreme forward end so that inertia forces operating on the propellant produce substantially only tensile forces on the propellant.

The specific nature of the invention as well as other objects and advantages thereof will clearly appear from a description of a preferred embodiment as shown in the accompanying drawing in which is shown a longitudinal sectional view of a rocket motor embodying the invention.

Referring to the drawing there is shown in assembled relation a rocket motor for a rocket projectile comprising a hollow housing 1 closed at its forward end by a suitable closure member 9 and having an annular nozzle adapter 6 threadably secured into the rear thereof, thereby defining a combustion chamber 2. A nozzle member 3 is secured to the housing 1 by a plurality of bolts 4 which pass thru a flange 7 on nozzle adapter 6 and thence into the wall of housing 1. Nozzle member 3 is hollow and its hollow portion is shaped to define a Venturi exhaust passage 5. The propellent charge comprises a plurality of longitudinally extending powder elements 20 which may be of any desired shape such as, sheet-like or cylindrical. Powder elements 20 are secured within combustion chamber 2 defined by housing 1 by insertion of their forward ends into a layer of cement-like material 14 which is applied to the forward wall 9 of combustion chamber 2. The cement-like material 14 preferably comprises plaster of Paris and the forward ends of the powder elements 20 are inserted in the plaster of Paris when wet and it is then permitted to dry. Powder elements 20 are thereby securely retained in combustion chamber 2.

The cement-like material 14 forms an effective gas seal and prevents the operation of gas pressure upon the forward end of powder elements 20. The powder elements are thus stressed substantially only in tension of the forces set up by the acceleration of the rocket projectile.

Ignition of powder elements 20 may be accomplished by any conventional means such as an electrical squib 21 mounted within combustion chamber 2. Squib 21 is preferably mounted adjacent a blowout type sealing disk 22, which may be provided across the forward end of nozzle passage 5.

It is apparent that the described trapping arrangement will positively retain the propellant charge within the combustion chamber until the propellant is substantially consumed and yet does not impair the flow of gases developed by combustion of the propellant.

I claim:

A rocket motor comprising in combination a housing defining a rearwardly opening elongated chamber, a nozzle aligned with the rearward opening of said chamber, a plurality of elongated powder elements and means for securing said powder elements in said chamber whereby said elements are disposed in spaced relationship to each other and to the walls of said chamber, said elements being substantially parallel to the longitudinal dimension of said chamber, said last mentioned means engaging each of said powder elements only at the forward ends of each whereby each powder element is stressed substantially only in tension by forces arising upon acceleration of a rocket embodying the motor, said mentioned means comprising a hardened layer of cement-like material applied to the forward wall of said chamber in which the forward ends of said powder elements are embedded.

CLARENCE N. HICKMAN.

REFERENCES CITED

The following references are of record in the file of this patent:

UNITED STATES PATENTS

| Number | Name | Date |
|---|---|---|
| 266,437 | Cunningham | Oct. 24, 1882 |
| 1,440,175 | Riabouchinski | Dec. 26, 1922 |
| 2,215,075 | Weldin | Sept. 17, 1940 |
| 2,446,560 | Skinner | Aug. 10, 1948 |